US007850519B2

(12) United States Patent
Majima et al.

(10) Patent No.: US 7,850,519 B2
(45) Date of Patent: Dec. 14, 2010

(54) GAME MACHINE

(75) Inventors: Shiro Majima, Tokyo (JP); Keiri Yoshioka, Tokyo (JP)

(73) Assignee: Konami Gaming Incorporated, Las Vegas, NV (US)

( * ) Notice: Subject to any disclaimer, the term of this patent is extended or adjusted under 35 U.S.C. 154(b) by 1096 days.

(21) Appl. No.: 10/658,086

(22) Filed: Sep. 9, 2003
(Under 37 CFR 1.47)

(65) Prior Publication Data

US 2004/0072606 A1 Apr. 15, 2004

(30) Foreign Application Priority Data

Oct. 9, 2002 (JP) ............................ 2002-295718

(51) Int. Cl.
*A63F 13/00* (2006.01)

(52) U.S. Cl. ............................ 463/20; 463/16; 463/31

(58) Field of Classification Search .................. 463/16, 463/17–20, 40–42; 273/138–142
See application file for complete search history.

(56) References Cited

U.S. PATENT DOCUMENTS

| | | | | |
|---|---|---|---|---|
| 4,570,934 | A | 2/1986 | Smyth | |
| 6,203,430 | B1 * | 3/2001 | Walker et al. | 463/20 |
| 7,070,502 | B1 * | 7/2006 | Bussick et al. | 463/20 |
| 7,144,322 | B2 * | 12/2006 | Gomez et al. | 463/20 |
| 2002/0155881 | A1 | 10/2002 | Yoshida | |
| 2003/0045345 | A1 * | 3/2003 | Berman | 463/20 |

FOREIGN PATENT DOCUMENTS

| | | | |
|---|---|---|---|
| JP | 60-37381 | U | 3/1985 |
| JP | 62-253091 | A | 11/1987 |
| JP | 07-031725 | | 2/1995 |
| JP | 9-28859 | A | 2/1997 |
| JP | 11-104353 | A | 4/1999 |
| JP | 2001-129149 | A | 5/2001 |
| JP | 2001-145736 | | 5/2001 |
| JP | 2002-360776 | | 12/2002 |

OTHER PUBLICATIONS

Patent Abstracts of Japan for JP2001-145736 published on May 29, 2001.
Patent Abstracts of Japan for JP2002-360776 published on Dec. 17, 2002.
Patent Abstracts of Japan for JP07-031725 published on Feb. 3, 1995.

* cited by examiner

*Primary Examiner*—Ronald Laneau
*Assistant Examiner*—Ross A. Williams
(74) *Attorney, Agent, or Firm*—Leason Ellis LLP.

(57) ABSTRACT

The present invention includes: a reel display module that changingly displays multiple types of symbols in multiple regions and also statically displays these changingly displayed symbols in these regions; measuring modules for measuring or storing modules for storing the number of times a special symbol, which is a symbol selected out of these symbols, is displayed in a changing manner and/or a static manner; and a game points evaluation module determining game points to be awarded to the player. The present invention increases a player's curiosity and anticipation for a game.

30 Claims, 7 Drawing Sheets

GAME MACHINE

TECHNICAL FIELD OF THE INVENTION

The present invention relates to a game machine that provides a changing display of multiple types of symbols in multiple regions and that provides a static display of the symbols displayed in a changing manner in these regions.

BACKGROUND OF THE INVENTION

Conventionally, game machines that use reels to provide a changing display of symbols are well known. Some of these game machines are equipped with a special reel in addition to, for example, a first, second, and third reel. This special reel contains symbols indicating multiplication factors such as 2×, 3×, 5×, or 10×, symbols such as blanks, or the like. When a game starts, the first, second, and third reels rotate (the symbols are displayed in a changing manner). Next, the reels are stopped at predetermined timings. Then, if a predetermined symbol is displayed when all the reels have stopped, the special reel is spun and stopped at a predetermined timing. If the special reel displays a symbol indicating a multiplication factor when it stops, the player is awarded a bonus payout, the amount of which is determined by taking the amount corresponding to the symbols statically displayed on the first, second, and third reels and multiplying by the multiplication factor statically displayed on the special reel.

However, because this bonus procedure with a special reel is widely known among players, it has become more difficult to stimulate the curiosity of players. These conventional game machines simply provide a bonus spin with the special reel based on the spin results of the first, second and third reel. Thus, increasing the player's anticipation is difficult. Thus, there is a need for a game device that can increase a player's curiosity and anticipation for the game.

The object of the present invention is to overcome these problems and to provide a game device that increases a player's curiosity and anticipation for the game.

SUMMARY OF THE INVENTION

A game machine according to the present invention includes: a reel display module providing a changing display of a plurality of types of symbols in a plurality of regions and a static display of the changingly displayed symbols in the regions; a measuring module measuring a number of times one of the symbols, a special symbol, is displayed in the reel display module in the changing and/or static display state; and a game points determining module determining game points to be awarded to a player based on the measured count.

With this structure, game points to be awarded to the player are determined using a new procedure not used in the conventional technology, thus provoking the player's interest. More specifically, game points to be awarded to the player are determined based on the number of times the special symbol is displayed in a changing and/or static state in the reel display module. Thus, the player is curious about how many times the special symbol is displayed in the reel display module. Then, game points are awarded based on this count, so the player desires the special symbol to be displayed in the reel display module as often as possible. This increases the player's curiosity and anticipation regarding the game.

According to another aspect, a game machine according to the present invention machine as described above further includes a selection module selecting at least one of the symbols to be changed to the special symbol. The measuring module measures a number of times the special symbol is displayed in the reel display module in the changing and/or static display state.

Since random selection is used for changing a symbol to a special symbol, the player has a hard time predicting which symbol will be the special symbol. As a result, when the special symbol appears, the player can be surprised. Also, since game points to be awarded to the player are determined based on the number of times the special symbol is displayed in a changing and/or static state in the reel display module, the player is curious about how many times the special symbol is displayed in the reel display module. Since game points are awarded based on this count, the player wants the special symbol to be displayed as often as possible. As a result, the player's curiosity and anticipation with regard to the game can be increased.

According to another aspect, in a game machine according to the present invention, the game points determining module calculates the game points to be awarded to the player using the measured count as one variable.

Since the number of times the special symbol is displayed is used as one variable in calculations, the game points to be awarded to the player can be determined using a simple procedure.

According to another aspect, in a game machine according to the present invention, the one variable is a sum of the measured counts.

Since the game points to be awarded to the player are calculated using the total number of times the special symbol is displayed as a variable, the game points can be determined using a simple procedure.

According to another aspect, in a game machine according to the present invention, the game points determining module determines the game points to be awarded to the player by using the measured count to look up a table set up ahead of time to associate the counts and game points.

Since the number of times the special symbol is displayed is used to look up a table set up ahead of time to associate display counts and game points, the game points to be awarded to the player can be determined using a simple procedure.

According to another aspect, in a game machine according to the present invention, a special region is set up in the reel display module; and the measuring module measures a number of times the special symbol is displayed in the special region in the changing and/or static display state.

Since the number of times the special symbol is displayed in the special region is measured, the standard by which to measure the display count for the special symbol is made clear. Also, the player has an easy time determining if the special symbol is displayed in the special region. As a result, the player's curiosity and anticipation can be increased.

According to another aspect, in a game machine according to the present invention, the special region is defined as a payline set up in the reel display module.

Since the number of times the special symbol is displayed in the payline is measured, the standard by which to measure the display count for the special symbol is made clear. Also, the player has an easy time determining if the special symbol is displayed in the payline. As a result, the player's curiosity and anticipation can be increased.

According to another aspect, in a game machine according to the present invention, a count display module displays counts measured by the measuring module in association with each of the plurality of regions.

Since the counts measured by the measuring module are displayed for each of the multiple regions, the player can easily determine the number of times the special symbol is displayed in each region. As a result, the player's anticipation can be increased regarding the counts displayed in each of the count display modules and the total number of times the special symbol is displayed.

According to another aspect, a game machine according to the present invention includes: a reel display module providing a changing display of a plurality of types of symbols in a plurality of regions and a static display of the changingly displayed symbols in the regions; a storage module storing a number of times one of the symbols, a special symbol, is displayed by the reel display module in the changing and/or static display state; and a game points determining module determining game points to be awarded to a player based on the measured count.

According to another aspect, a game machine according to the present invention includes: a reel display module providing a changing display of a plurality of types of main symbols in a plurality of regions and a static display of the main symbols being changingly displayed in the regions; a sub-symbol display module displaying at least one out of a plurality of types of sub-symbols; a sub-symbol selection module randomly selecting from the plurality of types of sub-symbols a sub-symbol to be displayed in the sub-symbol display module each time a special symbol out of the main symbols is displayed in the changing and/or the static display state in the reel display module; and a game point determination module determining a game point to be awarded to a player based on the sub-symbol displayed in the sub-symbol display module when the main symbol is statically displayed in the reel display module.

Since the game points to be awarded to the player are determined using a new procedure not used in the conventional technology, the player's interest can be provoked. More specifically, a sub-symbol to be displayed in the sub-symbol display module is randomly selected each time the special symbol is displayed in the reel display module in the changing state and/or the static state. As a result, the player becomes curious about which sub-symbol will be displayed. Then, when the main symbol is displayed statically in the reel display module, game points are awarded based on the sub-symbol displayed in the sub-symbol display module, making the player want the sub-symbol associated with game points to be displayed more. As a result, the player's curiosity and anticipation regarding the game is increased.

According to another aspect, in a game machine according to the present invention, a selection module selects at least one of the main symbols to be changed to a special symbol. The sub-symbol selection module randomly selects from the plurality of types of sub-symbols a sub-symbol to be displayed in the sub-symbol display module each time a special symbol out of the main symbols is displayed in the changing and/or the static display state in the reel display module.

Since a main symbol to be changed to the special symbol is randomly selected, the player has a hard time predicting which main symbol will be the special symbol. As a result, when the special symbol appears, the player can be surprised. Also, since a sub-symbol to be displayed in the sub-symbol display module is randomly selected each time the special symbol is displayed in the reel display module in a changing and/or static state, the player is curious about which sub-symbols will be displayed. Also, since game points are awarded based on the displayed sub-symbols, the player wants sub-symbols advantageous to the player to be displayed. As a result, the player's curiosity and anticipation regarding the game can be increased.

According to another aspect, in a game machine according to the present invention, a plurality of the sub-symbol display modules is set up so that each sub-symbol display module corresponds to one of the regions; each time the special symbol out of the main symbols is displayed in a changing and/or static state in the reel display module, the sub-symbol selection module randomly selects a sub-symbol to be displayed in the sub-symbol display module corresponding to the region.

Since multiple sub-symbol display modules are set up to correspond with the regions, the player is able to easily recognize which sub-symbols are displayed in the sub-symbol display modules corresponding to the regions. Also, since the sub-symbol to be displayed in a sub-symbol display module corresponding to a region is randomly selected each time the special symbol is displayed in the reel display module in a changing and/or static state, the sub-symbols can change until the main symbols are displayed statically. As a result, a sub-symbol with a large payout can change to a sub-symbol with a small payout or a sub-symbol with a small payout can change to a sub-symbol with a large payout. Thus, the player can experience a high degree of thrill.

According to another aspect, in a game machine according to the present invention, a special region is set up in the reel display module. Each time the special symbol out of the main symbols is displayed in a changing and/or static state in the special region, the sub-symbol selection module randomly selects a sub-symbol to be displayed in the sub-symbol display module corresponding to the region.

Since a sub-symbol to be displayed in the sub-symbol display module is randomly selected each time the special symbol is displayed in the special region, the timing at which sub-symbol selection takes place is explicit. Also, the player can easily determine if a special symbol is displayed in the special region. As a result, the player's curiosity and anticipation can be increased.

According to another aspect, in a game machine according to the present invention, a plurality of the special regions is set up in correspondence with the regions; and the sub-symbol selection module randomly selects a sub-symbol to be displayed in the sub-symbol display module corresponding to the regions each time the special region is displayed in the special region in the changing and/or static state.

Since special regions are set up to correspond with the regions, each time the special symbol is displayed in a region in either a changing or static state, a sub-symbol to be displayed in the sub-symbol display module corresponding to the region is randomly selected.

According to another aspect, in a game machine according to the present invention, the special region is defined as a pay line set up in the reel display module.

Since the random selection of a sub-symbol takes place when the special symbol is displayed on the payline, the timing at which selection takes place is made explicit. Also, the player is able to more easily determine when the special symbol is displayed on the payline. As a result, the player's curiosity and anticipation can be increased.

According to another aspect, in a game machine according to the present invention, a special region determination module determining through random selection a position for the special region in the reel display module; wherein the randomly selected special region is displayed in the reel display module.

Since the special region position in the reel display module is determined through random selection and the determined special region is displayed on the reel display module, the position of the special region is not known until it has been selected. Counting of the number of times the special symbol is displayed in the special region begins once the special region has been determined. As a result, compared to an arrangement where the position of the special region is fixed from the start, the game play is more varied. Also, if the sub-symbol is randomly selected each time the special symbol is displayed in the special region, the player has a hard time predicting the timing at which sub-symbols are selected. This allows the player to be surprised about what is displayed in the special region. As a result, the player's curiosity and anticipation can be increased.

According to another aspect, in a game machine according to the present invention, the special region determining module determines the special region through random selection when the main symbol is displayed in a changing state.

Since the random selection for the position of the special region takes place when the main symbols are being displayed in a changing state, the player is made curious about which main symbols will be displayed in a static state and the position at which the special region will be. When the position of the special region is determined, the sub-symbol to be displayed in the sub-symbol display module is randomly selected when the special symbol is displayed in the special region. Thus, the timing at which sub-symbols are to be randomly selected becomes almost completely unpredictable. As a result, compared to arrangements where the special region is at a fixed position from the start, game play can be made more varied. As a result, the player's curiosity and anticipation can be increased.

LIST OF DESIGNATORS

1: game machine; 7: reel display module; 30: CPU; 31: ROM; 32: RAM; 34: random number generator circuit; 100: reel display module; 101: first reel; 102: second reel; 103: third reel; 104: fourth reel; 105: fifth reel; 106-110: count display module; 111: total value display module; 112: payline; 113: payline

DETAILED DESCRIPTION OF THE PREFERRED EMBODIMENTS EMBODIMENT OF FIGS. 4 AND 5

Figure 2A:
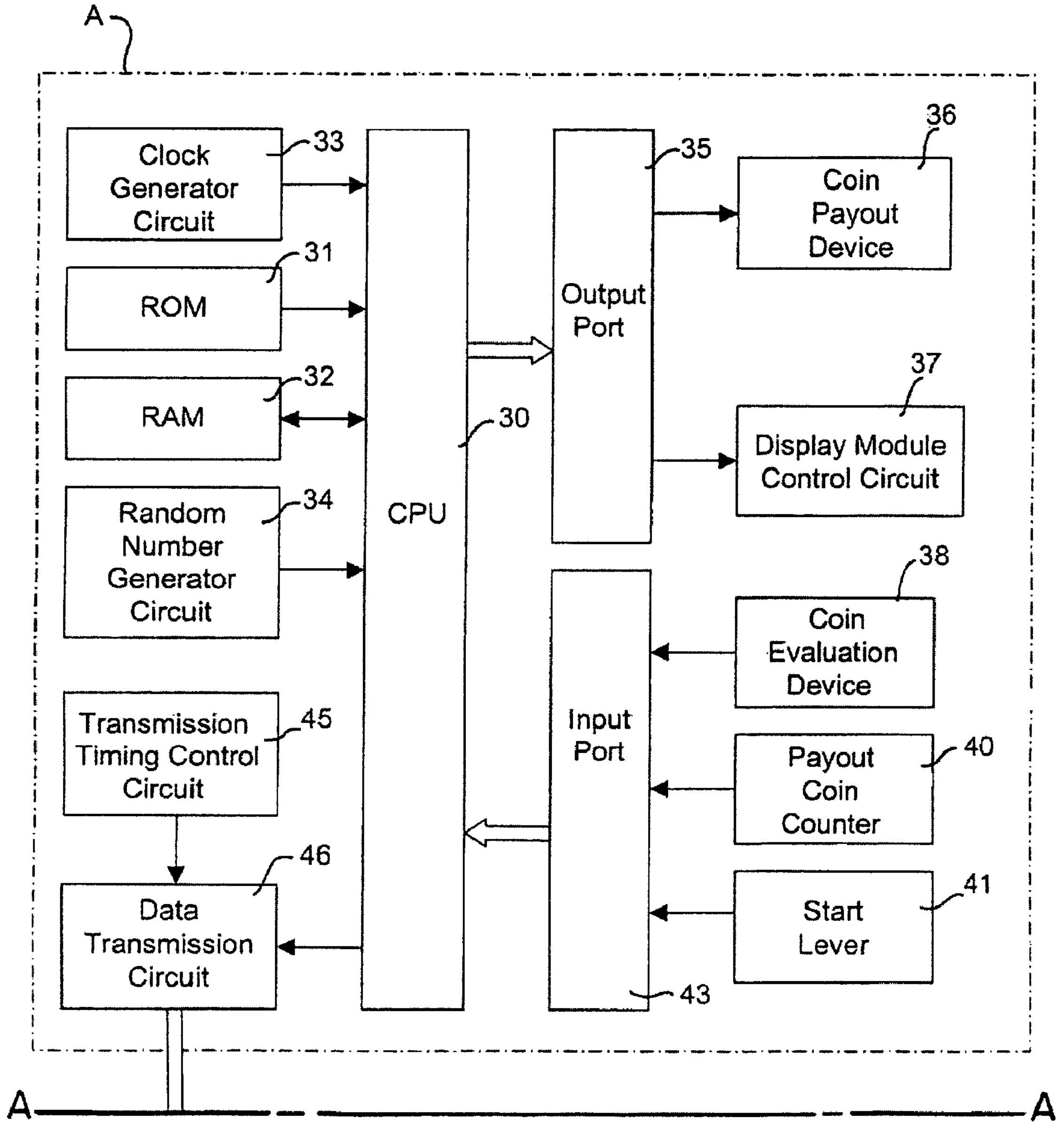
FIGS. 2A and 2B are drawings showing the electronic structure of the game machine according to the embodiment of FIG. 1.
Figure 3:
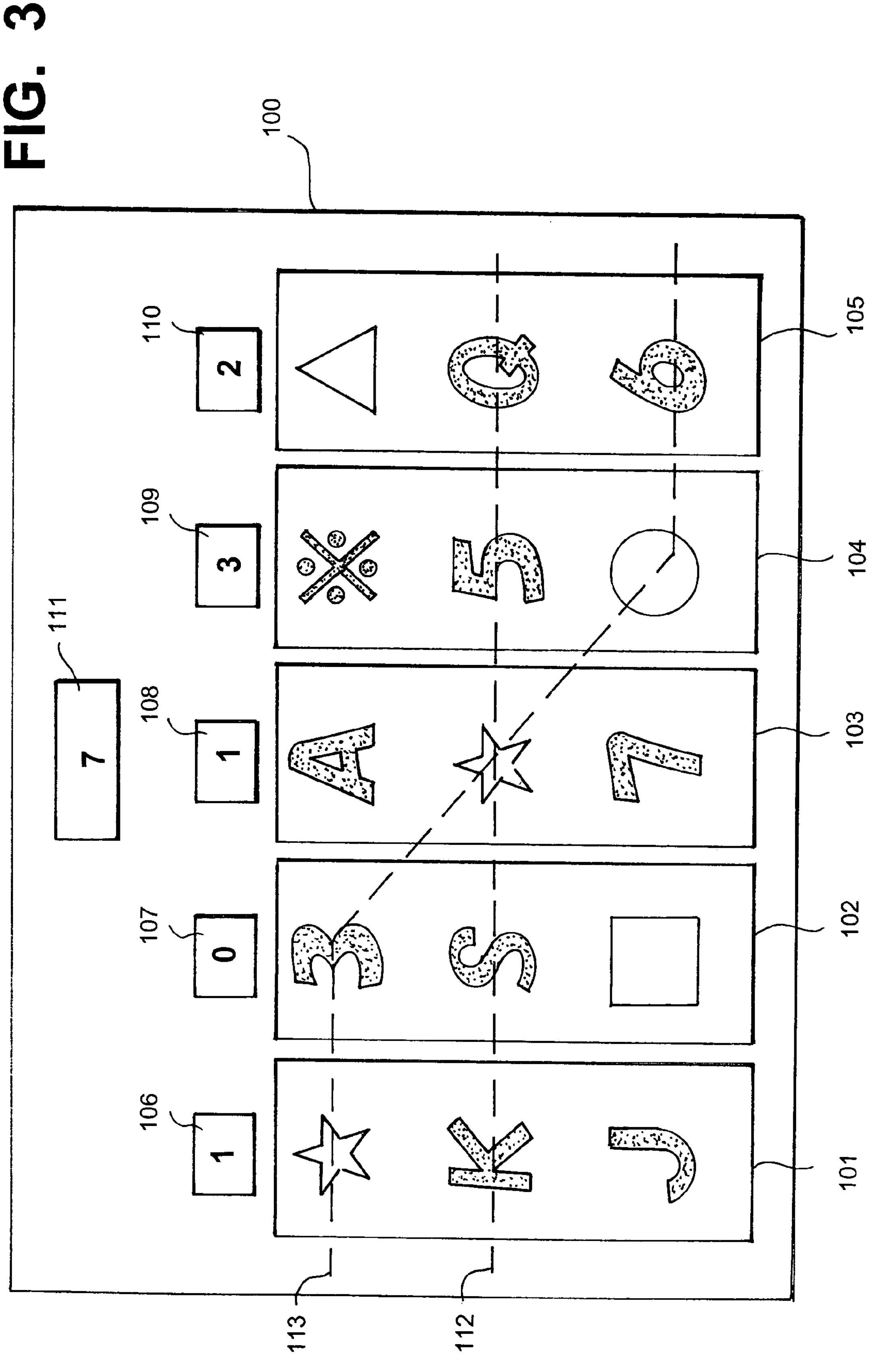
FIG. 3 is a drawing showing a reel display module.

In a game machine according to an embodiment of the present invention, a reel display module 100 as shown in FIG. 3 provides a varying display of multiple types of symbols on reels 101-105 in multiple regions. The reel display module 100 also provides a static display of the symbols displayed in a varying manner on the reels 101-105 in the regions. Also, a CPU 30 and a display module control circuit 37 shown in FIG. 2A form a measuring module that measures the number of times, of all the symbols, a special symbol was displayed either on the varying display or the static display on the reel display module 100. The measured count is displayed in count display modules 106-110 for each region. Also, the total of the count display modules 106-110 is displayed in a total display module 111. The total displayed in the total display module 111 is determined by the following equation, where the displayed measured count for the special symbol is a variable: (Total)=(the value displayed in the count display module 106)+(the value displayed in the count display module 107)+(the value displayed in the count display module 108)+(the value displayed in the count display module 109)+(the value displayed in the count display module 110).

Since the calculation is done with the displayed measured count of the special symbol acting as a variable, the game points to be awarded to the player can be determined with a simple operation.

The special symbol is also known as a kicker symbol. In the example shown in FIG. 3, the star is the kicker symbol (special symbol). The CPU 30, a ROM 31, and a RAM 32 shown in FIG. 2A form a game points evaluation module that evaluates the game points to be awarded to the player based on the measured counts. Also, if the special symbol or a combination of symbols are statically displayed at paylines 112, 113, which serve as special regions, it is considered a "win". These paylines can be set up in any manner.

The present invention can be applied to all devices that can display symbols, such as devices for games. In the example in this description, the present invention is applied to a game machine that can provide a changing display of a row (or, alternatively, a column) of multiple types of symbols, and based on internal selections, provides static displays of the changingly displayed symbols. The section that changingly displays the symbols can be a mechanical reel or, as described above, a video reel that provides a changing display of symbols as images on a liquid crystal screen or the like. The present invention can be implemented for game machines that, as in some slot machines, determine a stopping timing and stopping sequence for the reels by having the player actively operate a stop button, as well as for game machines that, as in pachinko game machines, sequentially stop the reels automatically regardless of the player's intent. Also, in this embodiment, coins are used as the example for the game prize, but the present invention is not restricted to this and any other medium that can provide game points such as pachinko balls can be used.

Figure 1:
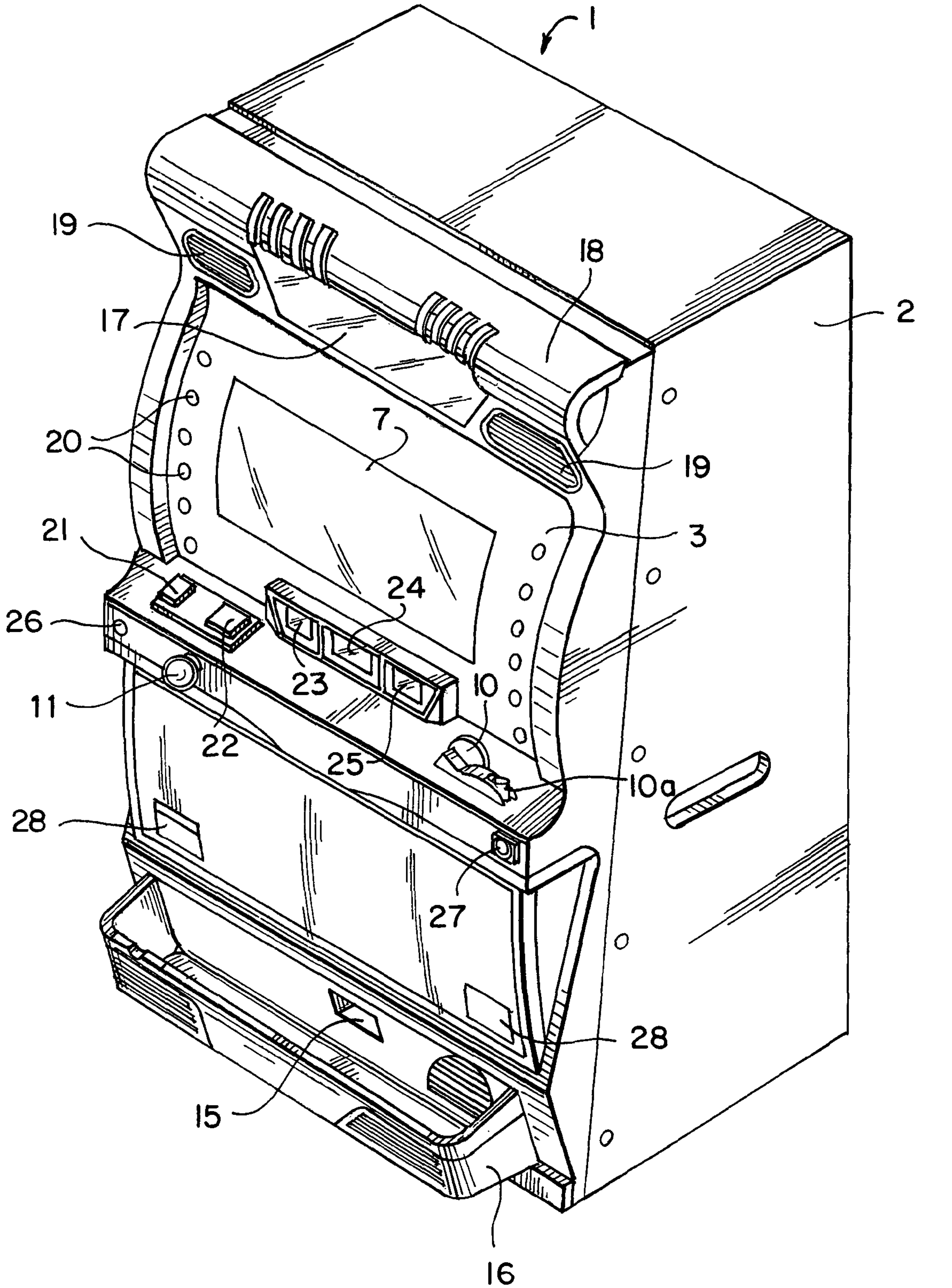
FIG. 1 is a drawing showing an external view of a game machine according to an embodiment of the present invention.

In FIG. 1, a game machine 1 is formed from a case 2 and a front panel 3 attached to the front surface of the case 2 so that it can be opened and closed. A liquid crystal panel or a CRT (Cathode-Ray Tube) is disposed behind the front panel 3, and a reel display module 7 displaying symbols in, e.g., five columns, is provided. This embodiment uses video reels. A program is executed to display five reels on the reel display module 7.

As shown in FIG. 3, the reel display module 7 includes five reels that can display symbols in a changing or static manner along the column direction (vertically, with respect to the game machine). More specifically, there are: the first reel 101, the second reel 102, the third reel 103, the fourth reel 104, and the fifth reel 105. The reels 101-105 can display the symbols in a changing or a static manner.

Also disposed on the front surface of the case 2 are a coin deposit opening 10 and a coin return button 10*a* that returns a coin in cases such as when a deposited coin is stuck. A start lever 11 is a lever used to start the rotating display (changing display) on the reel display module 7.

The game of the game machine 1 starts by having the player perform a bet operation to identify a valid payline. Different payline settings are possible, such as the horizontal center line, an upper or lower horizontal line, and a diagonal line. The bet operation is performed by depositing a coin in the coin deposit opening 10 described later or by performing a bet operation with a coin being stored using a stored coin deposit button 21. Bet operations can also be performed through a combination of these methods.

Once the player has identified a payline through a bet operation and operated the start lever 11, the reel display module 7 displays the symbols in a changing manner. When a predetermined duration has elapsed, the symbols being displayed in a changing manner are sequentially displayed in a static manner on the reel display module 7. For example, the stopping sequence can, when facing the game machine 1, go from left to right. When performing this stopping procedure, the stopping operations are separated by 0.5 second intervals. When the symbols are stopped and a predetermined symbol combination is displayed on one of the paylines, a prize associated with the predetermined symbol combination is awarded.

A coin payout opening 15 and a coin holding tray 16 are disposed below the front panel 3. A game effects display 17 is disposed above the front panel 3 to provide game effects. The game effects display 17 can be, for example, an LCD (Liquid Crystal Display) or can be formed from various types of lamps. In the example presented in this embodiment, an LCD is used. A bonus game display 18 is also disposed above the front panel 3. The bonus game display 18 is formed from LEDs (Light Emitting Diodes) and provides displays for high-value bonuses awarded to the player, game effects, errors, and the like. Speakers 19 generate voice instructions, music, sound effects, and the like. If a bonus prize is won, the game becomes more advantageous for the player, e.g., the win rate can become ⅓.

Multiple lamps 20 disposed on the front panel 3 are turned on, turned off, or turned on and off, in order to indicate the number of deposited coins (or the number of credits that have been bet), the activated payline, or when a prize has been won. The stored coin deposit button 21 is a button for using a predetermined number of coins stored (credited) in a coin storage device (not shown), and a stored coin deposit button 22 is a button for using the maximum allowed number of coins stored in the coin storage device (not shown). A coin storage count display module 23 displays the number of coins stored in the coin storage device (not shown). A prize count display module 24 displays a prize count or a remaining count or the like when a bonus is won. A coin payout count display module 25 displays a coin payout count and the like. The coin storage count display module 23, the prize count display module 24, and the coin payout count display module 25 can be formed, for example, from LEDs. An accounts button 26 settles accounts with regard to the stored coins. A locking device 27 locks and unlocks the door depending on the direction in which the locking device 27 is turned. A label 28 indicates the type of the game machine 1, the name of the manufacturer, or the like.

Figure 2B:
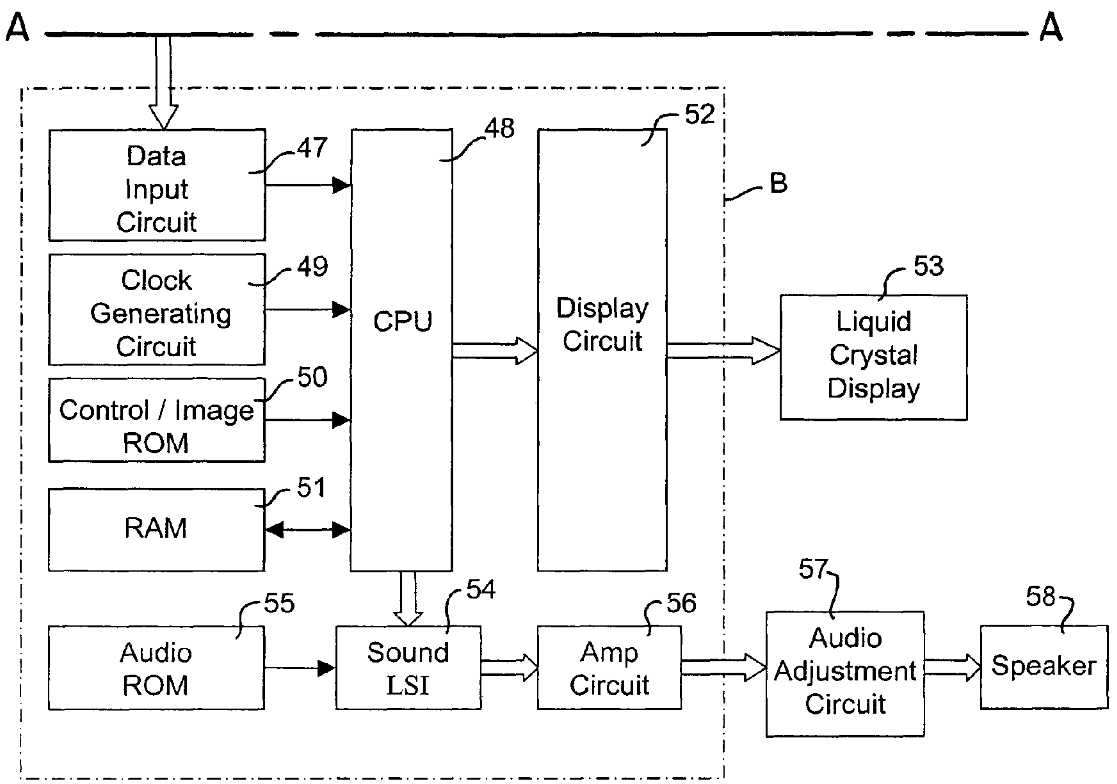

FIGS. 2A and 2B show the electronic architecture of the game machine according to this embodiment. The game machine 1 is formed, electronically, from a main substrate A and a sub-substrate B. The main substrate A is equipped with the CPU 30, the ROM 31, and the RAM 32 and performs control operations according to a program set up ahead of time. In addition to a control program for controlling the operations of the game machine 1, the ROM 31 stores prize group selection tables and the like used to determine prize groups ahead of time (an internal selection). The CPU 30, the ROM 31, and the RAM 32 form a predetermined region determining module.

Also, the CPU 30 is connected to a clock generator circuit 33 generating a reference clock pulse and a random number generator circuit 34 generating random numbers in a fixed manner. The CPU 30 and the random number generator circuit 34 form a sub-symbol selection module. A control signal from the CPU 30 is sent by way of an output port 35 to a coin payout device 36 that performs coin payout and a display module control circuit 37 that controls the reel display module 7.

Also the CPU 30 receives, by way of an input port 43, signals from a coin evaluation device 38, which determines whether a coin is valid or not, a payout coin counter 40, which counts the number of payout coins, and the start lever 41, which starts the rotation of the reel. Signals output from the CPU 30 are controlled by a transmission timing control circuit 45 controlling signal transmission timing to the sub-substrate B and are sent to the sub-substrate B by way of a data transmission circuit 46.

At the sub-substrate B, the signal sent from the data transmission circuit 46 is received by the data input circuit 47. The signal received by the data input circuit 47 is processed by CPU 48. CPU 48 is connected to a clock generating circuit 49 generating a reference clock pulse, a control/image ROM 50 in which various programs and image data are recorded, and a RAM 51. Data relating to images are sent from the CPU 48 to the liquid crystal display 53 by way of a display circuit 52, which performs image processing and the like. The liquid crystal display 53 displays text, static images, moving images, and the like. Also, data relating to audio is sent from the CPU 48 to an amp circuit 56 by way of a sound LSI (Large Scale Integrated Circuit) 54, which performs audio processing and the like. The sound LSI 54 extracts necessary audio data from an audio ROM 55 and performs audio data processing. The audio data that has been amplified and the like by the amp circuit 56 is sent to the speakers 58 by way of an audio adjustment circuit 57, which performs audio adjustments.

Figure 4:
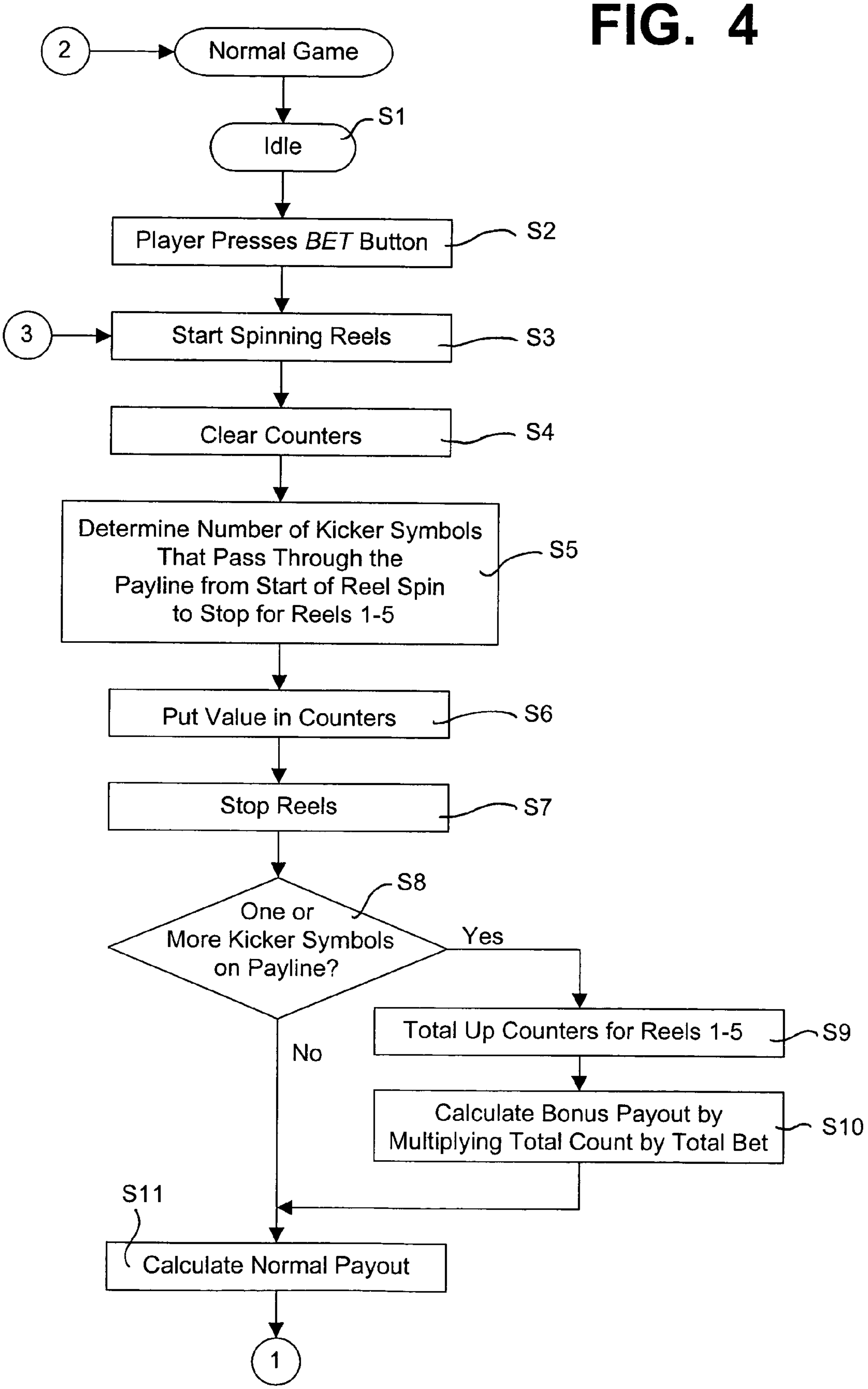
FIG. 4 is a flowchart showing the operations performed by the game machine according to the embodiment of FIG. 1.
Figure 5:
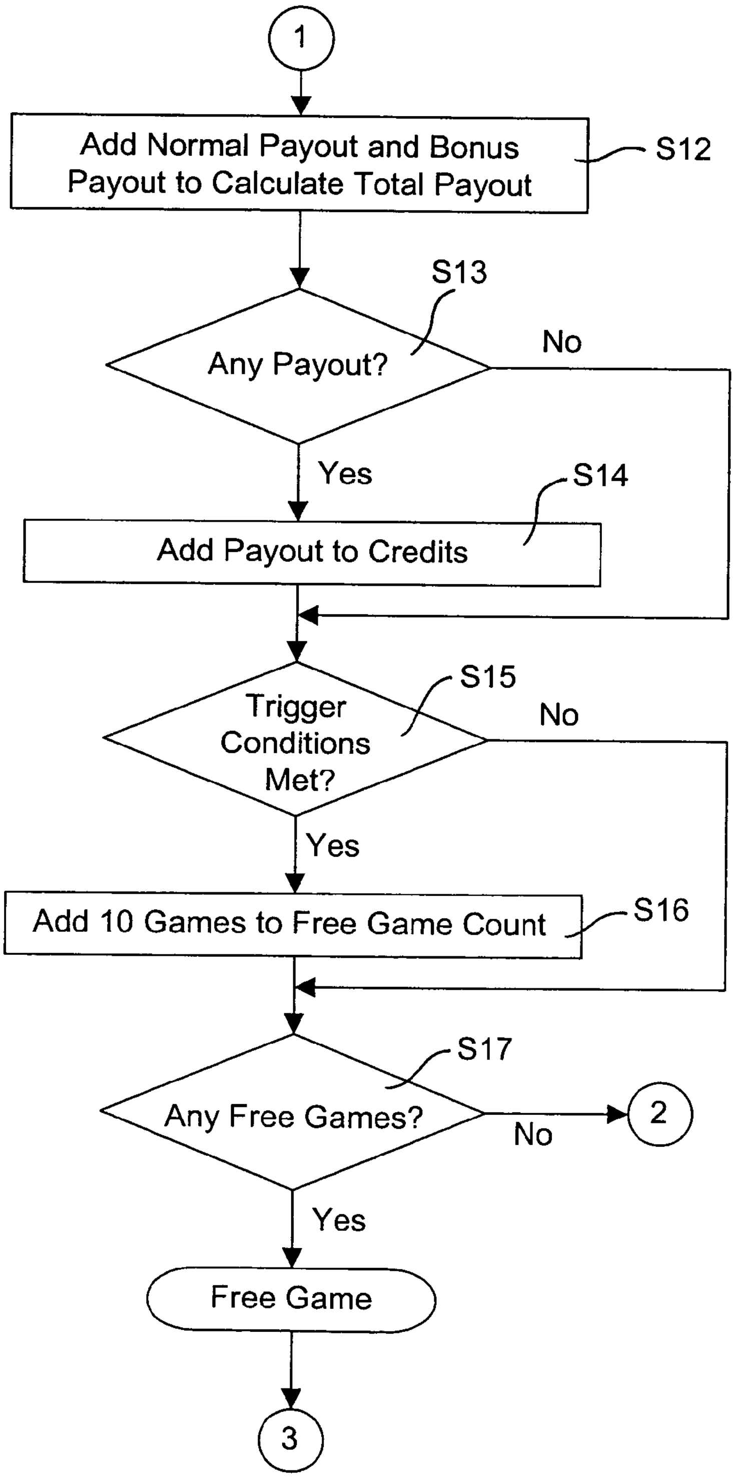
FIG. 5 is a flowchart showing the operations performed by the game machine according to the embodiment of FIG. 1.

Next, the operations of a game machine according to this embodiment will be described. FIGS. 4 and 5 show flowcharts illustrating the operations performed by the game machine 1. An example involving a normal game will be described. In a normal game, if, during a standby state (step S1), a player presses the BET button (step S2), all the reels begin spinning (step S3). At the same time, the values of the counter display modules 106-110 are cleared and set to "0" (step S4). Next the number of kicker symbols (e.g., special "star" symbols) that pass the payline, e.g., paylines 112 or 113, between the starting and stopping of the spinning of the reels is determined for each of the first reel 101 through the fifth reel 105 (step S5). Since the number of times the kicker symbol (the special symbol) was displayed on the payline is measured in this manner, the standard used for measuring the display count of the kicker symbol (special symbol) is clear. Also, this allows the player to easily determine if the kicker symbol (special symbol) was displayed on the payline. As a result, the player's curiosity and anticipation can be heightened.

It is also possible, when the symbols are being changingly displayed, to have the predetermined region determining module formed by the CPU 30, the ROM 31, and the RAM 32 determine the position of the predetermined region (payline) through random selection. Since the selection of the position of the predetermined region (payline) is performed when the symbols are being changingly displayed, the player becomes curious about which symbols will be displayed statically as well as curious about the positions that will be selected for the predetermined region. When the predetermined region position is determined, the number of times the special symbol was displayed at the predetermined region position is measured, so that the timing at which the special symbols are counted will be almost completely unpredictable. Thus, compared to machines in which the predetermined region positions are fixed from the start, this method provides more variation in game-play, thus increasing player curiosity and anticipation.

Next, the values determined for each reel are substituted in the counter display modules 106-110 (step S6). Since these counts are displayed for each region, the player can easily see the kicker symbol (special symbol) display count for each region. This increases player curiosity regarding the counts displayed in the count display modules.

Next the reels are stopped at a predetermined timing (step S7). An evaluation is made to determine if there is at least one kicker symbol (special symbol) on the payline (step S8). If there is at least one kicker symbol (special symbol) on the payline, the sum of the counter values in the count display modules 106-110 corresponding to the first reel 101 through the fifth reel 105 are totaled (step S9). At this point, the total count for the special symbols displayed in each region can be displayed in the total display module 111 as shown in FIG. 3, thus increasing the player's anticipation regarding the value of the total count. Next, the bonus payout is calculated by using the total counter value as one variable and multiplying by the total bet (step S10). Since the calculation is performed using the total number of times the special symbol was displayed as one variable, the game points to be awarded the player can be determined in a simple manner. Next, the win amount (normal payout) is calculated (step S11), and the normal payout and the bonus payout are totaled to determine the total win amount (step S12).

Next, a determination is made as to whether there is any win amount (step S13). If there is no win amount, control proceeds to step S15. If there is a win amount, the win amount is added to the player's credit (step S14). Next, an evaluation is made as to whether a trigger condition is met, i.e., whether three kicker symbols (special "star" symbols) have appeared (step S15). If the trigger condition is not met, control proceeds to step S17. If the trigger condition is met, ten games are added to the free game count (step S16). Next, the free game count is checked to see if there are any free games (step S17). If there are no free games, the next game is started as a normal game. If there are any free games, the reels begin spinning for the next game, which is a free game.

When operating the game machine 1, the steps described above can be instantaneously performed by executing them as a program. More specifically, at step S2, the instant the player presses the BET button, the values in the count display modules 106-110 are cleared (step S4), and counts are taken of the number of times the kicker symbol (special symbol) passes the payline starting with when the reels start spinning and ending when they stop (step S5). These counter values are displayed in the counter display modules 106-110 once the game starts. Also, once the reels stop (step S7), whether or not one or more kicker symbols (special symbols) are to be displayed on the payline is determined randomly (step S8). If one or more kicker symbols (special symbols) are to be displayed on the payline, the counter values to be displayed by the count display modules 106-110 are totaled (step S9). Then, using the sum of the counter values as a variable, the bonus allotment is multiplied by the total bet (step S10). The normal payout is calculated (step S11), and the sum is taken of the normal allotment and the bonus allotment (step S12). If there is a win amount, the win amount is added to the player's credit (step S14). An evaluation is made of whether three kicker symbols (special symbols) appear (step S15), and, if so, ten games are added to the free game game count (step S16). These operations are performed by having the CPU 30 execute a program while signals are passed back and forth between the ROM 31, the RAM 32, and the random number generator circuit 34. Thus, these operations are performed instantaneously.

In step S9, the counter values of the count display modules associated with the reels are totaled, but it is also possible to determine a value to be multiplied against the total bet by using the measured number of times the kicker symbol (special symbol) appeared for each reel and looking up a table set up ahead of time in which the kicker symbol counts are associated with game points.

By looking up a table set up ahead of time in which the kicker symbol counts are associated with game points, it is possible to determine game points to be awarded the player using a simple procedure.

The above description presents an embodiment of the present invention in which the CPU 30 and the display module control circuit 37 form a measuring module that measures the number of times, of all the symbols, a special symbol was displayed either on the varying display or the static display on the reel display module 100. The CPU 30 and the display module control circuit 37 can form a storage module that stores the number of times, of all the symbols, a special symbol is displayed either on the varying display or the static display on the reel display module 100. If the CPU 30 and the display module control circuit 37 form the storage module, then the measuring operation described above is not performed. More specifically, in conventional game machines that award prizes based on symbol arrangements, such as conventional slot machines, it is widely known that a computer disposed in the game can randomly determine, the moment the player presses the BET button so that the reels start to spin, which symbols pass which display regions how many times and the final stopping position of the symbol. Thus, there is no need to use measuring means to measure the number of times a special symbol is displayed, and it is sufficient to provide a storage module for storing the randomly determined count described above. This corresponds to the CPU 30 and the display module control circuit 37 forming a storage module storing the number of times, of all the symbols, a special symbol is displayed either on the varying display or the static display on the reel display module 100. The other operations are the same as those from the structure using the measuring module so their descriptions will be omitted here.

Compared to the conventional technology, the game machine 1 according to this embodiment as described above uses a newer method to determine game points to be awarded to a player, thus increasing the player's interest. More specifically, the game points to be awarded to the player are determined based on the number of times the kicker symbol (special symbol) is displayed at the reel display module 7 in a changing display state and/or a static display state. Thus, the player is made curious about the number of times the kicker symbol (special symbol) was displayed on the reel display module 7. Since game points are awarded based on these numbers, the player will want the special symbol to be displayed at the reel display module 7 more often, thus increasing the player's curiosity and anticipation regarding the game.

Figure 6:
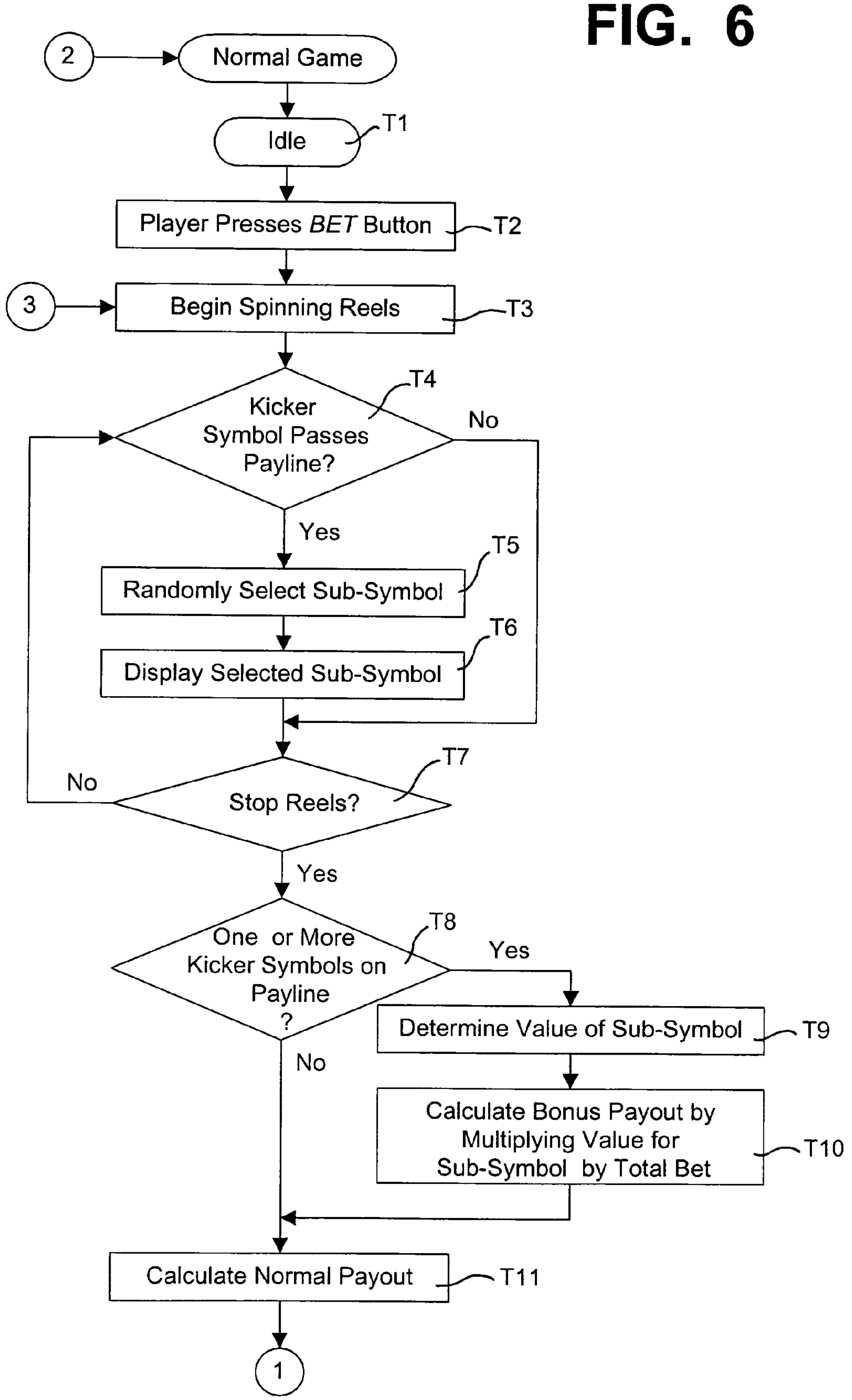
FIG. 6 is a flowchart showing the operations performed by a game machine according to another embodiment of the present invention.

Embodiment of FIG. 6

In another embodiment of the present invention, as shown in FIG. 3, main symbols, including a kicker symbol (special symbol), are displayed in a static or changing manner on the first reel 101 through the fifth reel 105. The count display modules 106-110, which serve as sub-symbol display modules, display multiple types of sub-symbols in a static or changing manner. Like the main symbols, the sub-symbols are various symbols, e.g., card suites, numbers, dice rolls, roulette symbols, a slot reel, or heads and tails of coins. Each time the kicker symbol (special symbol) out of the main symbols is displayed on the first reel 101 through the fifth reel 105 while the main symbols are in a changing and/or static display state, a sub-symbol selection module, formed from the CPU 30 and the random number generator circuit 34, randomly selects sub-symbols from the multiple types of sub-symbols to be displayed on the count display modules 106-110.

When the main symbols are displayed statically in the first reel 101 through the fifth reel 105, the game points evaluation module formed from the CPU 30, the ROM 31, and the RAM 32 uses the sub-symbols displayed at the count display modules 106-110 to determine game points to be awarded to the player. Each time the kicker symbol (special symbol) is displayed when the main symbol is being displayed in a changing and/or static manner, a sub-symbol to be displayed in the count display modules 106-110 is selected randomly from the multiple types of sub-symbols, so curiosity about the sub-symbol that will be displayed is provoked in the player. When the main symbols are displayed statically at the first reel 101 through the fifth reel 105, game points are awarded based on sub-symbols displayed in the count display modules 106-110. Thus, the player comes to desire the display of sub-symbols that award more game points. This increases the player's curiosity and anticipation regarding the game.

The count display modules 106-110 are set up to correspond to the first reel 101 through the fifth reel 105. This allows the player to easily keep track of the sub-symbol displayed in the count display module associated with each reel. Each time the kicker symbol (special symbol) is displayed in the first reel 101 through the fifth reel 105 during the static and/or changing display of the main symbols, sub-symbols to be displayed on the count display modules 106-110 corresponding to the reels 101-105 are selected randomly. Thus, the sub-symbols can change until the main symbols are displayed statically. As a result, a sub-symbol with a large payout can change to a sub-symbol with a small payout, and a sub-symbol with a small payout can change to a sub-symbol with a large payout. Thus, the player can experience a high level of thrill.

FIGS. 5 and 6 show flowcharts of the operations performed by the game machine according to this embodiment. Referring to FIG. 6, in the case of a normal game, the game machine is in a standby state (step T1), and a player presses the BET button (step T2). All the reels begin rotating (spinning) (step T3). Next, an evaluation is made to determine if the kicker symbol (special "star" symbol) has passed the payline (step T4). If the kicker symbol (the special "star" symbol) has not passed the payline, control proceeds to step T7. If the kicker symbol (the special "star" symbol) passed the payline for one of the reels, a sub-symbol is randomly selected for display on the sub-symbol display module corresponding to the reel (step T5). The selected sub-symbol is then displayed on the sub-symbol display module (step T6).

When the main symbols are displayed in a changing manner, the predetermined region determination module formed by the CPU 30, the ROM 31, and the RAM 32 can determine the predetermined region (payline) position through random selection. The random selection for determining the predetermined region (payline) position is performed when the main symbols are changingly displayed. Thus, the player is curious about how the main symbols will be statically displayed at the same time as being curious about the position at which the predetermined region will stop. When the position of the predetermined region is determined, sub-symbols are selected randomly to be displayed on the sub-symbol display module when the special symbol is displayed at the predetermined region. Thus, the timing at which the sub-symbols are randomly selected become almost completely unpredictable. As a result, compared to an arrangement where the predetermined region is at a fixed position from the start, a more variable game play is possible. This increases the curiosity and anticipation of the player.

Next, the reels are checked to see if they have all stopped (step T7). If all the reels have not stopped, control proceeds to step T4. If, on the other hand, all the reels have stopped, an evaluation is made to determined if there is at least one kicker symbol (special symbol) on the payline (step T8). If there is at least one kicker symbol (special symbol) on the payline, the combination of sub-symbols displayed on the count display modules 106-110, which serve as the sub-symbol display module, are checked to determine if a predetermined combination is present (step T9). The "predetermined combination" referred to here is any multiple sub-symbol combination determined ahead of time. Examples of these combinations include a "1" or a predetermined symbol, e.g., a circle, displayed in all the sub-symbol display modules. Alternatively, if dice rolls are displayed on the sub-symbol display module, the sum of the dice rolls can serve as the combination. Also, each of the combinations is associated with a corresponding multiplication factor or payout. Next, a bonus payout is calculated by multiplying a value corresponding to the sub-symbol combination with the total bet (step T10). Next, the normal payout is calculated (step T11).

The operations performed after step T11 are similar to those from the embodiment of FIGS. 4 and 5. More specifically, as shown in FIG. 5, the normal payout and the bonus payout are added to determine the total payout (step S12). Next, an evaluation is made to determine if there is a payout or not (step S13), and if there is no payout, control proceeds to step S15. If there is a payout, the payout value is added to the player's credit (step S14). Next, an evaluation is made to see if trigger conditions are met, i.e., if three kicker symbols (special "star" symbols) have appeared (step S15). If the trigger conditions are not met, control proceeds to step S17. If trigger conditions are met, ten games are added to the free game account (step S16). Next, an evaluation is made to determine if the free game count has a value (step S17). If there are no free games, the next game is started as a normal game. If there are any free games, the reels are spun for the next game, which is started as a free game (step T3).

With this embodiment as described above and shown in FIG. 6, a new method not used in the past is implemented to determine game points awarded to the player. This provokes the player's interest. More specifically, each time the special symbol is displayed in a reel display module 100 while the main symbols are being displayed in a changing or a static manner, a sub-symbol to be displayed in the sub-symbol display module is selected randomly from the multiple types of sub-symbols. Thus, the player is made curious about which sub-symbol will be displayed. When the main symbols are displayed statically in the reel display module 100, game points are awarded based on the sub-symbols displayed in the sub-symbol display module. Thus, the player desires the display of sub-symbols that will award more game points. As a result, the player's curiosity and anticipation regarding the game can be heightened.

An Alternate Embodiment

In another embodiment of the present invention, a selector module formed from the CPU 30 and the random number generator circuit 34 randomly selects at least one of the symbols described in the embodiment of FIGS. 4 and 5 to be change into the special symbol. In this selection, one of the "reel positions" associated with each symbol on each reel is selected randomly. Then, the symbol associated with the selected reel position becomes the special symbol. When the special symbol is randomly selected in this manner, the measuring module formed from the CPU 30 and the display module control circuit 37 measures the number of times the special symbol is displayed in a changing and/or static state. Then, based on the measured display count, the game points evaluation module formed from the CPU 30, the ROM 31, and the RAM 32 determines game points to be awarded to the player.

More specifically, the moment the player presses the BET button, a reel position for the symbol to serve as the special symbol is randomly determined. Then, while the first reel 101 through the fifth reel 105 are spinning, a "bee" animation is displayed as an attraction on the reel display module 100. This "bee" flies around randomly in the reel display module 100. Then, the bee lands on the symbol associated with the reel position that was randomly selected. Then, the symbol upon which the bee landed becomes the special symbol.

There can be one bee or multiple bees. If there are multiple bees, they can land on symbols on multiple reels or they can land on multiple symbols within a single reel. Alternatively, multiple bees can land on a single symbol. If multiple bees land on a single symbol, the display count can be multiplied by the number of bees.

The symbol upon which the bee landed is treated as a special symbol and is counted in a manner similar to that described in the embodiment of FIGS. 4 and 5. The count results are used as a basis for determining whether a bonus payout will be awarded or whether a free game will be awarded. If the symbol on which the bee landed stops at the payline, a payout corresponding to a combination involving the symbol can be received regardless of whether or not the bee landed there.

With this embodiment described above, a symbol is randomly selected to be changed to a special symbol. Thus, the player has a hard time predicting which symbol will be the special symbol. As a result, when the special symbol appears, the player can be surprised. Also, the game points to be awarded to the player are determined based on the number of times the special symbol is displayed in a changing and/or static state. Thus, the player is made curious about how many times the special symbol is displayed in the reel display module 100. Also, since game points are awarded based on this count, the player wants the special symbol to be displayed in the reel display module 100 as often as possible. This increases the player's curiosity and anticipation with regard to the game.

An Alternate Embodiment

In another embodiment of the present invention, a selection module formed from the CPU 30 and the random number generator circuit 34 performs random selection for changing at least one of the main symbols indicated in the embodiment of FIG. 6 to a special symbol. As in the previous embodiment, a "reel position" associated with each main symbol is randomly selected for each reel. The main symbol associated with the selected reel position becomes the special symbol. When a special symbol has been determined through this random selection, a sub-symbol selection module formed from the CPU 30 and the random number generator circuit 34 makes a selection, out of the multiple types of sub-symbols, for sub-symbols to be displayed in the count display modules 106-110, which serve as the sub-symbol display modules, each time the special symbol is displayed in the changing and/or static display state in the reel display module 7. A game points evaluation module formed from the CPU 30, the ROM 31, and the RAM 32 determines a game point to be awarded to the player based on the sub-symbols displayed in the count display modules 106-110.

More specifically, the instant the player presses the BET button, the selection module randomly selects a reel position for a main symbol to be the special symbol. Then, while the first reel 101 through the fifth reel 105 are rotating, a "bee" animation is displayed in the reel display module 100. This "bee" flies around randomly in the reel display module 100. Then, the bee lands on the main symbol corresponding to the reel position that was randomly selected. The main symbol on which the bee lands then becomes the special symbol.

As in the previous embodiment, there can be one or more bees displayed. If more than one bee is displayed, they can land on the main symbols on multiple reels, or they can land on main symbols on a single reel. Alternatively, multiple bees can land on a single main symbol. If multiple bees land on a single main symbol, the game point to be awarded to the player can be based on the number of bees.

The main symbol on which a bee has landed is treated as a special symbol. As in the embodiment of FIG. 6, each time the special symbol has been displayed in the reel display module 7, sub-symbols to be displayed in the count display modules 106-110, which serve as the sub-symbol display module, is randomly selected from multiple types of sub-symbols. Then, a game point to be awarded to the player is determined based on the sub-symbols displayed on the count display modules 106-110. Thus, the displayed sub-symbols serve as data used to determine whether a bonus payout is to be awarded or not and whether a free game is to be awarded or not. Also, if a symbol on which a bee landed stops at the payline, a payout associated with the value of the symbol can be received regardless of whether a bee landed on it or not.

In this embodiment as described above, when a main symbol indicated in the embodiment of FIG. 6 is to be randomly selected for transformation into the special symbol, the player has difficulty in predicting which main symbol will be the special symbol. As a result, the player can be surprised when the special symbol appears. Also, each time the special symbol is displayed in the reel display module in a changing and/or static display state, a sub-symbol to be displayed in the sub-symbol display module is randomly selected from the multiple types of sub-symbols, thus making the player curious about which sub-symbols will be displayed. Also, since game points are awarded based on the displayed sub-symbols, the player will want the sub-symbols that are advantageous to be displayed. As a result, the player's curiosity and anticipation regarding the game can be increased.

The symbols displayed at the payline or the reel display module 100 can be fixed or can be selected by the player. The feature for counting symbols displayed at the payline or the reel display module 100 can be performed in the normal games described above or can be performed in secondary games such as bonus games and free games or can be performed at any time during a game. Furthermore, the counter for the kicker symbol (special symbol) displayed at the payline or the reel display module can be incremented by multiplication rather than by addition for use in connection with game results. Alternatively, one of the three operations of addition, subtraction, and multiplication can be selected randomly according to a fixed procedure (ratio or number of operators) and applied to the counter value.

ADVANTAGES OF THE INVENTION

As described above, a game machine according to an embodiment of the present invention includes: a reel display module providing a changing display of multiple types of symbols in multiple regions and a static display of the changingly displayed symbols in these regions; a measuring module measuring the number of times a special symbol is displayed in a changing and/or static display state; and a game point determination module determining a game point to be awarded to the player.

Alternatively, a game machine according to an embodiment of the present invention includes: a reel display module providing a changing display of multiple types of symbols in multiple regions and a static display of the changingly displayed symbols in these regions; a storage module storing the number of times a special symbol is displayed in a changing and/or static display state; and a game point determination module determining a game point to be awarded to the player.

In either of these structures, game points to be awarded to the player are determined using a new procedure that was not used in the conventional technology, thus provoking the interest of the player. More specifically, the game points to be awarded to the player are determined based on the number of times the special symbol is displayed in the reel display module in a changing and/or static display state. Thus, the player is made curious about how many times the special symbol has been displayed in the reel display module. Since the game points are awarded based on this number, the player wants the special symbol to be displayed in the reel display module as often as possible. As a result, the player's curiosity and anticipation with regard to the game are increased.

We claim:

1. A game machine comprising:

a reel display module having plurality of reels and providing a changing display state of a plurality of types of symbols in a plurality of regions, the changing display state showing a spinning of the plurality of reels, and a static display state of said changingly displayed symbols in said regions, at least one of said symbols being a special symbol, said reel display module causing the display to go from displaying spinning reels to the display of static reels at a predetermined time or after a predetermined duration;

a measuring module measuring a count that is a number of times said special symbol in each of said reels of said reel display module passes through at least one of said regions while the reel display module is in the changing display state showing the spinning of the reels between the starting and stopping of the spinning reels;

a game points determining module determining game points to be awarded to a player based on said measured count; and count display modules, each of which correspondingly display said count for one of said plurality of said reels, said count being measured by said measuring module in association with each of said plurality of regions.

2. A game machine as described in claim 1, further comprising a selection module selecting at least one of said symbols to be changed to said special symbol.

3. A game machine as described in claim 1, wherein said game points determining module calculates said game points to be awarded to said player using said measured count as one variable.

4. A game machine as described in claim 3, wherein said one variable is a sum of a plurality of said measured counts, each of said measured counts being a number of times said special symbol is displayed in one of said regions.

5. A game machine as described in claim 1, wherein said game points determining module determines said game points to be awarded to said player by using said measured count to look up a table set up ahead of time to associate said count and said game points to be awarded.

6. A game machine as described in claim 1, further comprising:

a special region in said reel display module; and said count being a number of times said special symbol is displayed in said special region in at least said changing display state.

7. A game machine as described in claim 6, wherein said special region is a payline in said reel display module.

8. A game machine as described in claim 6, further comprising:

a total display module for displaying a total of the counts displayed by the count display modules.

9. A game machine as described in claim 6, further comprising a special region determination module determining, through random selection, a position for said special region in said reel display module; wherein said randomly selected special region is displayed in said reel display module.

10. A game machine as described in claim 9, wherein said special region determining module determines said special region through random selection when said special symbol is displayed in said changing display state.

11. A game machine comprising:

a reel display module having plurality of reels and providing a changing display state of a plurality of types of symbols in a plurality of regions, the changing display state showing a spinning of the plurality of reels, and a static display state of said changingly displayed symbols in said regions, at least one of said symbols being a special symbol, said reel display module causing the display to go from displaying spinning reels to the display of static reels at a predetermined time or after a predetermined duration;

a storage module storing a count that is a number of times said special symbol of each of said reels of said reel display module passes through at least one of said regions while the reel display module is in the changing display state showing the spinning of the reels between the starting and stopping of the spinning reels;

a game points determining module determining game points to be awarded to a player based on said stored count; and count display modules, each of which correspondingly displaying said count for each of said reels, said count being stored by said storage module in association with each of said plurality of regions.

12. A game machine as described in claim 11, further comprising a selection module selecting at least one of said symbols to be changed to said special symbol.

13. A game machine as described in claim 12, wherein said game points determining module calculates said game points to be awarded to said player using said stored count as one variable.

14. A game machine as described in claim 12, wherein said game points determining module determines said game points to be awarded to said player by using said stored count to look up a table set up ahead of time to associate said count and said game points to be awarded.

15. A game machine as described in claim 11, wherein said game points determining module calculates said game points to be awarded to said player using said stored count as one variable.

16. A game machine as described in claim 15, wherein said one variable is a sum of a plurality of said stored counts, each of said stored counts being a number of times said special symbol is displayed in one of said regions.

17. A game machine as described in claim 11, wherein said game points determining module determines said game points to be awarded to said player by using said stored count to look up a table set up ahead of time to associate said count and said game points to be awarded.

18. A game machine as described in claim 11, further comprising:

a special region in said reel display module; and said count being a number of times said special symbol is displayed in said special region in at least said changing display state.

19. A game machine as described in claim 18, wherein said special region is a payline in said reel display module.

20. A game machine as described in claim 18, further comprising a special region determination module determining, through random selection, a position for said special region in said reel display module; wherein said randomly selected special region is displayed in said reel display module.

21. A game machine as described in claim 20, wherein said special region determining module determines said special region through random selection when said special symbol is displayed in said changing display state.

22. A method of providing a game on a game machine with a processor and a display, said method comprising the steps of:

said processor providing on the display a changing display state of a plurality of types of symbols in a plurality of regions of a reel display module, the changing display state showing a spinning of a plurality of reels, and a static display state of said changingly displayed symbols in said regions of said reel display module, at least one of said symbols being a special symbol, said changing display going from displaying spinning reels to the display of static reels at a predetermined time or after a predetermined duration;

storing in a memory of the processor a count that is a number of times said special symbol of said reel display module passes through at least one of said regions while the reel display module is in the changing display state showing the spinning of the reels between the starting and stopping of the spinning reels;

said processor determining game points to be awarded to a player based on said stored count; and the display displaying correspondingly to each of reels of said reel display module said stored count in association with each of said plurality of regions.

23. The method as described in claim 22, further comprising the step of selecting at least one of said symbols to be changed to said special symbol.

24. The method as described in claim 22, further comprising the step of calculating said game points to be awarded to said player using said stored count as one variable.

25. The method as described in claim 24, wherein said one variable is a sum of a plurality of said stored counts, each of said stored counts being a number of times said special symbol is displayed in one of said regions.

26. The method as described in claim 22, wherein said game points determining step comprises the step of looking up a table set up ahead of time to associate said count and said game points to be awarded.

27. The method as described in claim 22, wherein said count is a number of times said special symbol is displayed in a special region in said reel display module in at least said changing display.

28. The method as described in claim 27, wherein said special region is a payline in said reel display module.

29. The method as described in claim 27, wherein:

counting for said count begins after said special region is determined.

30. The method as described in claim 22, wherein said game points determining step comprises the steps of:

determining a total count as the sum of stored counts for each reel of said reel display module; and multiplying the total count by a total bet.

* * * * *